US008065675B2

(12) United States Patent
Strauss et al.

(10) Patent No.: US 8,065,675 B2
(45) Date of Patent: Nov. 22, 2011

(54) IN-PAGE INSTALLER

(75) Inventors: Jonathan Strauss, Beverly Hills, CA (US); Derrick Whittle, Marietta, GA (US); Marco Boerries, Los Altos Hills, CA (US); Ashit Gandhi, Marietta, GA (US); Johnny J. Speaks, Canton, GA (US)

(73) Assignee: Yahoo! Inc., Sunnyvale, CA (US)

( * ) Notice: Subject to any disclaimer, the term of this patent is extended or adjusted under 35 U.S.C. 154(b) by 1280 days.

(21) Appl. No.: 11/689,469

(22) Filed: Mar. 21, 2007

(65) Prior Publication Data

US 2008/0235680 A1 Sep. 25, 2008

(51) Int. Cl.
*G06F 9/445* (2006.01)

(52) U.S. Cl. ........ 717/178; 717/171; 717/175; 717/176; 717/177; 709/201; 709/223

(58) Field of Classification Search ........................ None
See application file for complete search history.

(56) References Cited

U.S. PATENT DOCUMENTS

| | | | | |
|---|---|---|---|---|
| 5,909,545 A * | 6/1999 | Frese et al. | ..................... | 709/208 |
| 5,919,247 A * | 7/1999 | Van Hoff et al. | ................ | 709/217 |
| 5,923,885 A * | 7/1999 | Johnson et al. | ................ | 717/176 |
| 5,996,073 A * | 11/1999 | Lee et al. | ............................. | 713/1 |
| 6,049,671 A * | 4/2000 | Slivka et al. | ................... | 717/173 |
| 6,073,163 A * | 6/2000 | Clark et al. | ..................... | 709/203 |
| 6,157,953 A * | 12/2000 | Chang et al. | ................... | 709/225 |
| 6,167,567 A * | 12/2000 | Chiles et al. | ................... | 717/173 |
| 6,289,378 B1 | 9/2001 | Meyer | | |
| 6,343,377 B1 * | 1/2002 | Gessner et al. | ............... | 717/171 |
| 6,366,298 B1 | 4/2002 | Haitsuka et al. | | |
| 6,408,434 B1 * | 6/2002 | Fujiwara | ........................ | 717/170 |
| 6,546,554 B1 * | 4/2003 | Schmidt et al. | ................ | 717/176 |
| 6,640,238 B1 * | 10/2003 | Bowman-Amuah | .......... | 709/201 |
| 6,675,382 B1 * | 1/2004 | Foster | ............................ | 717/177 |
| 6,880,086 B2 | 4/2005 | Kidder et al. | | |
| 6,898,619 B1 * | 5/2005 | Tran | ............................... | 709/203 |

(Continued)

FOREIGN PATENT DOCUMENTS

EP 0926614 A2 6/1999

(Continued)

OTHER PUBLICATIONS

Title: Web based control system design and analysis, author: Qingcang Yu et al, source: IEEE, Jun. 2004.*

(Continued)

*Primary Examiner* — Chameli Das
(74) *Attorney, Agent, or Firm* — James J. DeCarlo; Greenberg Traurig, LLP

(57) ABSTRACT

A method of notifying a user about the existence of relevant software and facilitating the installation of such software using a browser. A user's interactions with the browser are monitored to determine a context for a given browsing session, and it is determined whether software relevant to the context is available. If such software is available, it is recommended to the user, and if the user wishes to install the software, the installation can be performed via the browser. The software can be recommended to the user through a variety of means, including incorporating the recommendation in a static web page, incorporating the recommendation in a dynamic web page, and delivering the recommendation as part of advertising content. The recommendation may include a link to installation scripts or the like which facilitate the installation of the software by the browser.

44 Claims, 8 Drawing Sheets

U.S. PATENT DOCUMENTS

| | | | |
|---|---|---|---|
| 7,062,567 B2 | 6/2006 | Benitez | |
| 7,624,086 B2 * | 11/2009 | Keith, Jr. | 706/60 |
| 7,647,392 B2 * | 1/2010 | Sharma et al. | 709/223 |
| 7,882,501 B1 * | 2/2011 | Carlson et al. | 717/167 |
| 2002/0129102 A1 * | 9/2002 | Landsman et al. | 709/203 |
| 2003/0192033 A1 * | 10/2003 | Gartside et al. | 717/126 |
| 2003/0195949 A1 * | 10/2003 | Slivka et al. | 709/219 |
| 2004/0128669 A1 * | 7/2004 | Furst et al. | 717/178 |
| 2005/0071251 A1 | 3/2005 | Linden et al. | |
| 2005/0091382 A1 * | 4/2005 | Adams et al. | 709/228 |
| 2005/0210459 A1 * | 9/2005 | Henderson et al. | 717/168 |
| 2006/0031226 A1 * | 2/2006 | Cope et al. | 707/10 |
| 2006/0259867 A1 | 11/2006 | Watson et al. | |

FOREIGN PATENT DOCUMENTS

| | | |
|---|---|---|
| WO | 00/29922 | 5/2000 |
| WO | 02/01319 A2 | 1/2002 |
| WO | 03/034257 A1 | 4/2003 |

OTHER PUBLICATIONS

Supplemental European Search Report for EP 08 73 2147.7, mailed Jul. 19, 2010.

International Search Report (PCT/US2008/056885) dated Jul. 31, 2008.

* cited by examiner

IN-PAGE INSTALLER

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The instant disclosure relates to the field of computer software, and more specifically provides a system and methods through which software applications can be installed on a user computer via a web page.

BACKGROUND

With the prevalence of news reports about computer security problems, many of which are effectuated by the installation of malicious computer software on an unsuspecting user's computer, users are understandably wary about installing any new software. In addition, for a large section of the population, installing new software is a daunting task—they are prompted to confirm installation paths, installation options, and other attributes that may be difficult for novice users to understand. As a result, computer software companies frequently compete for the opportunity to have their software installed on new computers as those computers are distributed by the manufacturer. By having the software pre-installed, the computer software companies can obviate the need for the user to subsequently install the software. As a result, those computer software companies are able to realize higher adoption rates for their software than computer software companies that do not have their software preinstalled.

Some in the prior art have attempted to address these shortcomings by simplifying the computer software installation process. By way of example, the InstallShield installation tool, distributed by Macrovision Corporation of Santa Clara, Calif., and the Wise Installation Studio, distributed by Altiris, Inc. of Lindon, Utah, provide means through which much of the software installation process can be automated. However, such installation tools require that new installers be created for each application, and application version. The installers package the entire installation into one or more compressed, digitally signed files, which are subsequently extracted by the installer. The installer then removes at least a portion of itself after the software is installed.

Others in the industry have attempted to address the issue by simplifying the installation of program updates, thereby at least reducing the number of times a user must install a program. By way of example, Microsoft Corporation, or Redmond, Wash., provides the ClickOnce deployment technology. ClickOnce is a deployment technology that allows software developers to create self-updating applications for the Microsoft Windows™ family of operating systems. The self-updating applications can be installed and run with minimal user interaction. More information about the ClickOnce deployment technology can be found at http://msdn2.microsoft.com/en-us/library/142dbbz4.aspx.

SUMMARY

What is needed are systems and methods through which computer software installation and updates can be further simplified. Accordingly, the instant disclosure is directed to an in-page computer software installer that substantially obviates one or more of the problems due to limitations and disadvantages of the related art.

As described above, many computing devices come pre-loaded with computer software, and many users limit themselves to only using such computer software, even where other computer software exists that may be better suited to the users' needs. Similarly, computer software may exist that would be advantageous to a particular user, but the user may be unaware that such software exists.

Many systems exist through which users can be profiled based on their use of and interactions with conventional web browsers, such as, without limitation, Internet Explorer, distributed by Microsoft Corporation of Redmond, Wash., and Firefox, distributed by the Mozilla Corporation of Mountain View, Calif. Through the use of such profiling systems, it is possible to determine whether computer software exists that is likely to be of interest to the user. The instant disclosure leverages such profiling systems to alert the user of the existence of such software, and streamlines the installation of such computer software.

Additional features and advantages of the invention will be set forth in the description which follows, and in part will be apparent from this disclosure, or may be learned by practice of the invention. The objectives and other advantages of the invention will be realized and attained by the structure particularly pointed out in this written description, including any claims contained herein and the appended drawings.

Some embodiments of the in-page computer software installer offer users the ability to download software in relevant contexts across the Web, and to obtain such software as quickly and painlessly as possible without breaking that context. The solution enables a Web page or the like to offer to install the appropriate software for the user, and for such offers to be embedded into an existing Web page in a way that dynamically tailors the offer and call to action based on the context provided by the page and the configuration of the user's computing device. This is in contrast to those traditional installers that support Web-based installations, wherein the installer must be launched from a dedicated Web page. By way of example, without limitation, a user may search a computer software repository, such as widgets.yahoo.com, for software capable of presenting the digital photographs stored on the user's computer as a slideshow. Such a search may return several software applications that might be of interest to the user. The in-page computer software installer can easily allow the user to install one or more the software applications returned as part of the search.

In some embodiments, the in-page computer software installer can also automatically manage installation dependencies specific to the configuration of user's computing device, without requesting or requiring input from the user. This can enable the user to go from clicking a call to action on a Web page to running the software without additional, intermediate action on the user's part.

Some embodiments of the in-page computer software installer are open and extensible, with the ability to dynamically manage installation dependencies for any software submitted to a repository, based on settings provided by the submitter and parameters dictated by the developer of the parent web page, and subject to the configuration of the user computing device.

Some embodiments leverage a distributable architecture, thereby facilitating deployment in a variety of environments, and facilitating changes to the underlying architecture. In some embodiments, this can be achieved by embedding a "badge" into the installer into a web page via an IFRAME, or inline frame, as defined in the HTML 2.0 specification, or similar element. In some embodiments, the in-page computer software installer may be implemented by hard-coding the appropriate functionality manually into an individual Web page. In still other embodiments, the in-page computer software installer may be implemented by creating a module that can be dynamically embedded in any Web page. In still other embodiments, the in-page computer software installer may be implemented by embedding the appropriate functionality into ad-served media.

Some embodiments comprise a method of notifying a user about the existence of relevant software and facilitating the installation of such software, comprising monitoring user interactions with a browser running on a computing device during a browsing session; determining a context for the browsing session based on the monitored user interactions; determining whether software relevant to the context is available; recommending the determined software to the user; and, facilitating the installation of the determined software through an in-page installer. In some embodiments, the facilitating step further comprises determining whether the browser is a supported browser and facilitating the installation of the determined software through a standard installer if the browser is not a supported browser; determining whether the necessary code libraries are installed on the computing device and installing any needed code libraries on the computing device; obtaining from a central application server an installation script; and, causing the browser to initiate the installation script.

In some embodiments, the installation script, or portions thereof, may be digitally signed, and the digital signature can be used to verify that the installation script is from a trusted source. If the installation script is not from a trusted source, the in-page installer may refuse to perform the installation, or the in-page installer may request additional authorization from the user before initiating the installation.

In some embodiments, the in-page installer may further comprise building a profile for the user based on the monitored user interactions. In some embodiments, the determined software is recommended to the user through an advertisement. In some embodiments, the determined software is recommended to the user through content dynamically incorporated into a web page appearing in the browser.

In some embodiments, the context may be determined, at least in part, based on keywords, metadata, or other such information associated with the page currently displayed by the browser. In some embodiments, the context may be determined, at least in part, based on the results of a search performed by the user, such as a search using the popular Yahoo! search engine.

Some embodiments comprise a system for facilitating software installation, comprising: a standard web server; an application server; an application dependency database; a browser operating on a computing device capable of rendering content presented by the standard web server; and, a set of commands, interpretable by the browser, wherein the set of commands facilitate obtaining an installation script from the application dependency database, obtaining files referenced in the installation script from the application server, and executing the installation script to install software. In some embodiments, the application server may comprise the application dependency database. Some embodiments may further comprise a first code library, installed on the computing device, wherein the first code library facilitates interaction between an operating system running on the computing device and the browser. Some embodiments may further comprise a second code library, installed on the computing device, wherein the second code library facilitates obtaining information about the operating system and other software applications installed on the computing device. In some embodiments, the first code library and the second code library are incorporated into a single code library.

Some embodiments may comprise aspects of the in-page installer incorporated into one or more computer program products.

There is great potential business significance to this solution. It is designed to ensure that once a few core files are installed on a user's PC, the installation of any additional software will be completely painless to the user. Embodiments of the solution are architected in an open and extensible manner to enable very lightweight and configurable deployment, which will greatly increase the number and relevance of distribution points. Additionally, the ability to leverage the targeting technology of an advertisement server opens up an entirely new method of distribution. The end result of this proliferation of distribution opportunities combined with the elimination of the most onerous user pain points associated with conventional downloadable software distribution is predicted to be a significant increase in the number of successful software installations, as well as higher retention of those users who adopt such software. This enables computer manufacturers and computer software vendors to move away from the current practice of aggressively bundling less than relevant software with more popular software products, and instead focus on giving users more software that they want in the context in which they are looking for it.

It is to be understood that both the foregoing general description and the following detailed description are exemplary and explanatory and are intended to provide further explanation of the disclosed in-page computer software installer.

BRIEF DESCRIPTION OF THE DRAWINGS

The accompanying drawings, which are included to provide a further understanding of the disclosed in-page computer software installer and are incorporated in and constitute a part of this specification, illustrate various embodiments and, together with the description, serve to explain the principles of at least one embodiment of the disclosed in-page computer software installer.

In the drawings.

DETAILED DESCRIPTION

Reference will now be made in detail to embodiments of the disclosed in-page computer software installer, examples of which are illustrated in the accompanying drawings.

Figure 1:
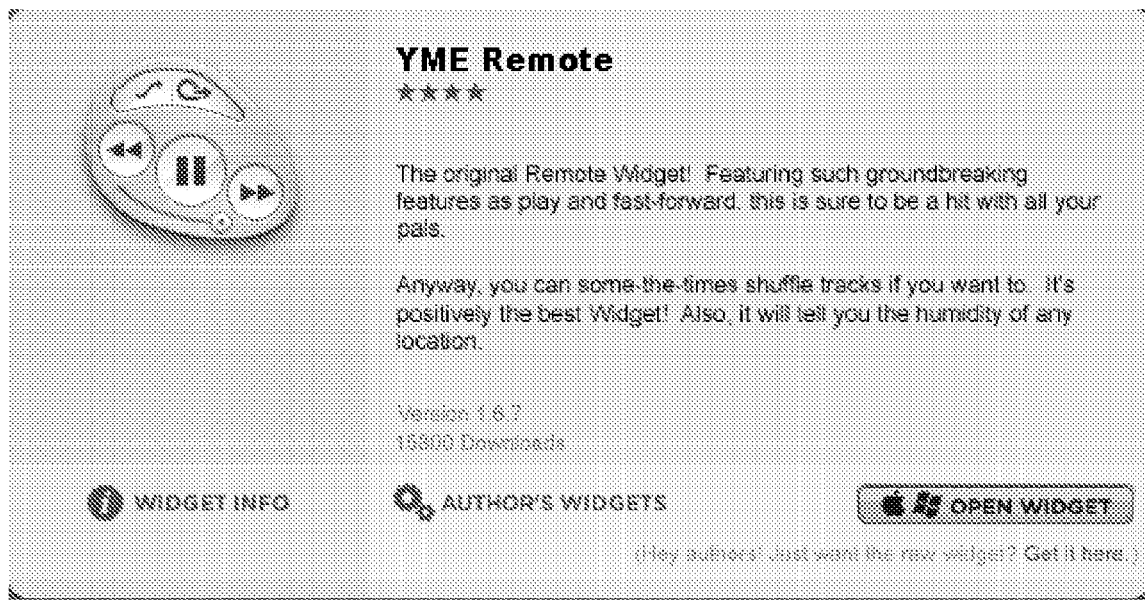
FIG. 1 is a screen capture illustrating an exemplary user interface through which a user can be advised of the existence of software of potential interest to the user.

The instant disclosure describes a system and methods through which software can be recommended to a user based on the user's interactions with a web browser, and subsequently installed for the user. By way of example, without limitation, several systems exist which permit users to be profiled based on the World Wide Web ("Web") sites they visit and information entered therein, such as, without limitation, the searches performed by the user via one or more search engines. Such profiles can the be used to determine the user's areas of interest, and these areas of interest can subsequently be used to identify software that may be advantageous for or desirable to a user. FIG. 1 is a screen capture of an exemplary user interface through which a user can be advised of the existence of such software. In the example illustrated in FIG. 1, the instant system is recommending "YME Remote" a small, specialized application known as a "widget" that facilitates control over the well-known Yahoo! Music Engine ("YME"). Widgets have an advantage of utilizing relatively little microprocessor time and/or memory to operate. In some embodiments, widgets may be written as ActiveX controls, or in JAVA, Java Script, VBScript, or the like, which facilitates the operation of such widgets within the browser. Although the instant disclosure describes a system and methods for recommending widgets to users, it should be apparent to one skilled in the art that alternative software can be substituted therefor without departing from the spirit or the scope of the invention.

Figure 2:
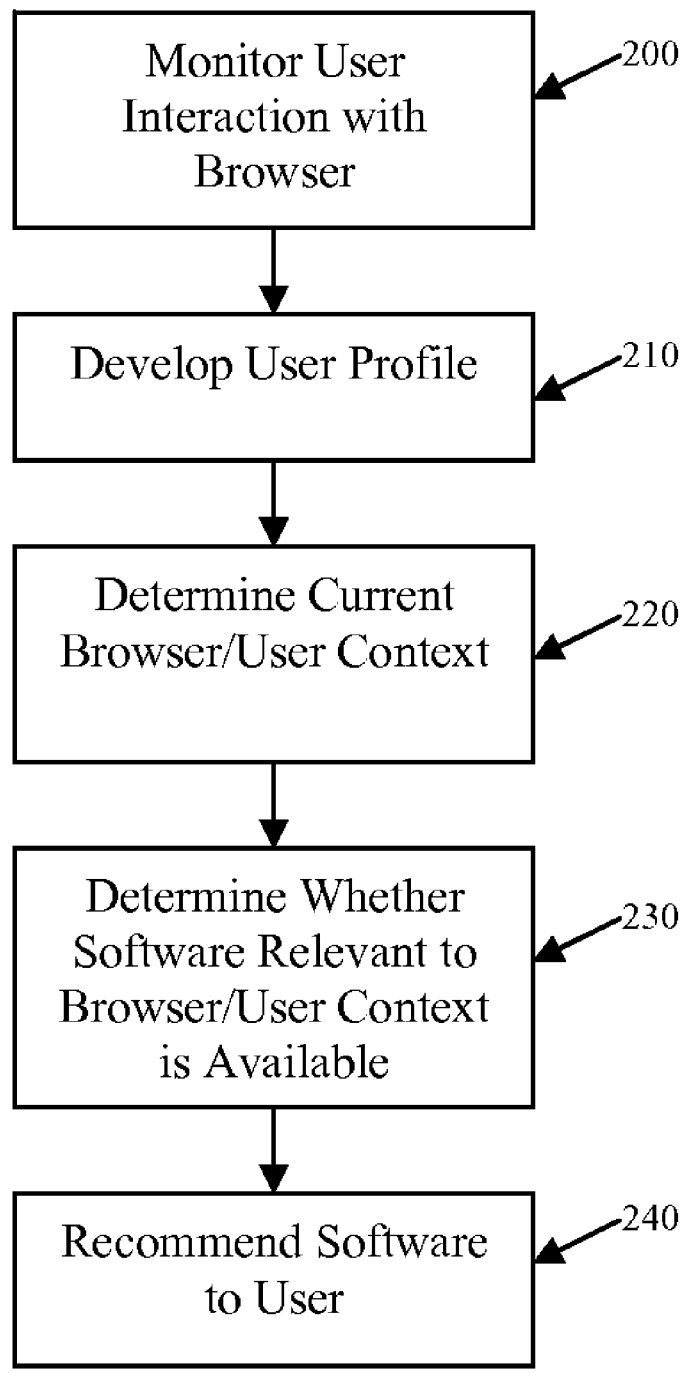
FIG. 2 is a flow chart illustrating an exemplary method through which software of interest to a user can be identified.

FIG. 2 is a functional block diagram illustrating an exemplary method through which software can be recommended to a user. In Block 200, the user's interactions with a web browser are monitored, and a profile is subsequently developed based on these interactions (Block 210). In Block 220, as the user further interacts with the browser, the instant system and methods can determine a specific context for the user's interaction with the browser. The instant system and methods can then determine whether software is available that is relevant to and/or appropriate for the user's context and profile (Block 230), and can recommend the software to the user (Block 240). By way of example, without limitation, the profile may determine that the user is a male, most likely between the ages of 18 and 25, that the user frequently purchases digital music, and utilizes YME to manage his digital music. When the user subsequently uses the browser to search for "media players" or visits a Web page with downloadable media players, the instant system and methods can also search a database of available widgets and other software to identify software that may be of interest to the user. Once identified, the instant system and methods can alert the user to the fact that the YME Remote software exists via an interface such as that illustrated in FIG. 1, by substituting or inserting the alert as an advertisement, or otherwise calling the user to action. In some embodiments, the call to action can incorporate an in-page software installer, thereby streamlining and simplifying the installation of the software.

Figure 3A:
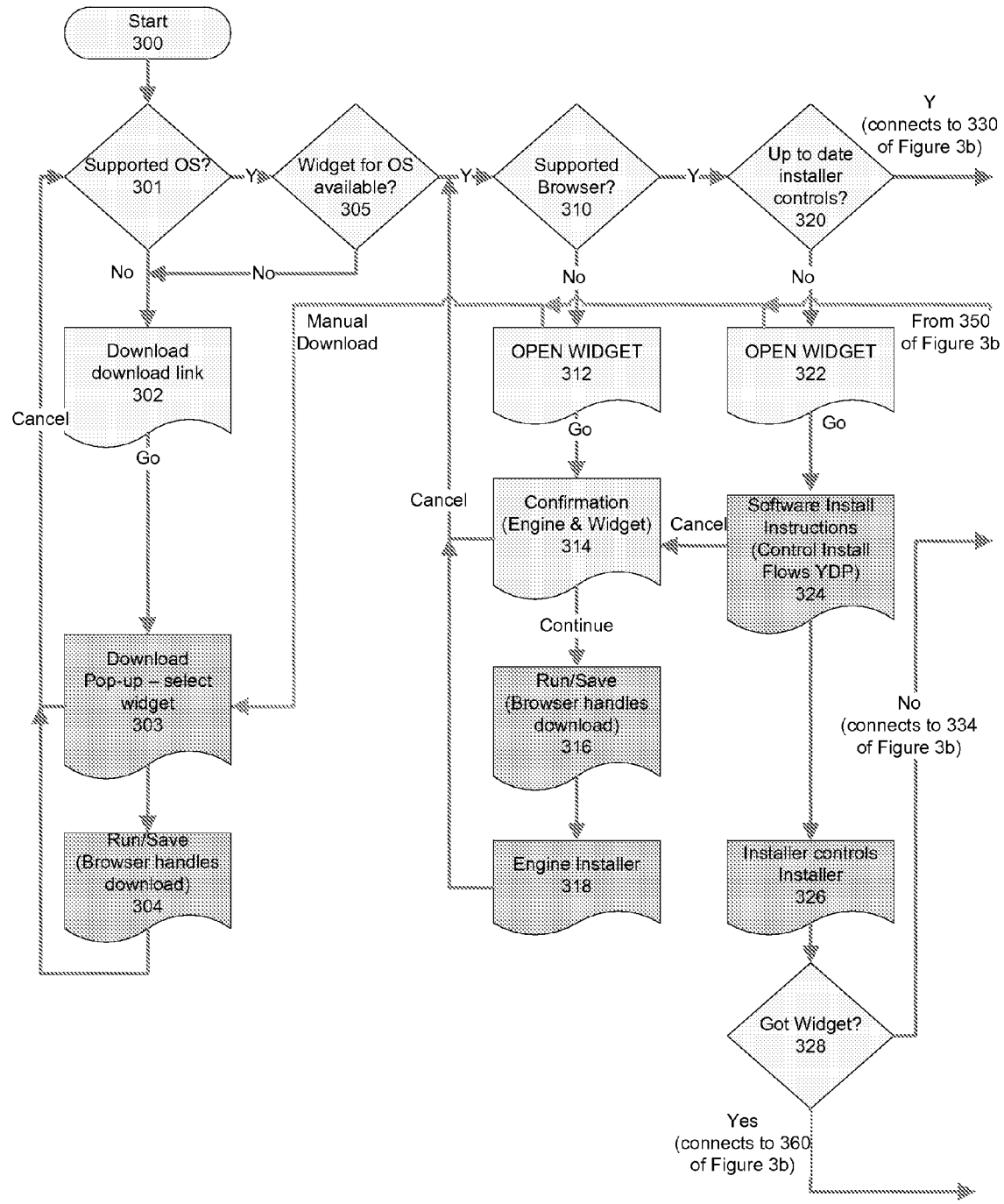
FIGS. 3a and 3b are a flow chart illustrating an exemplary method through which software can be installed using an in-page installer.
Figure 3B:
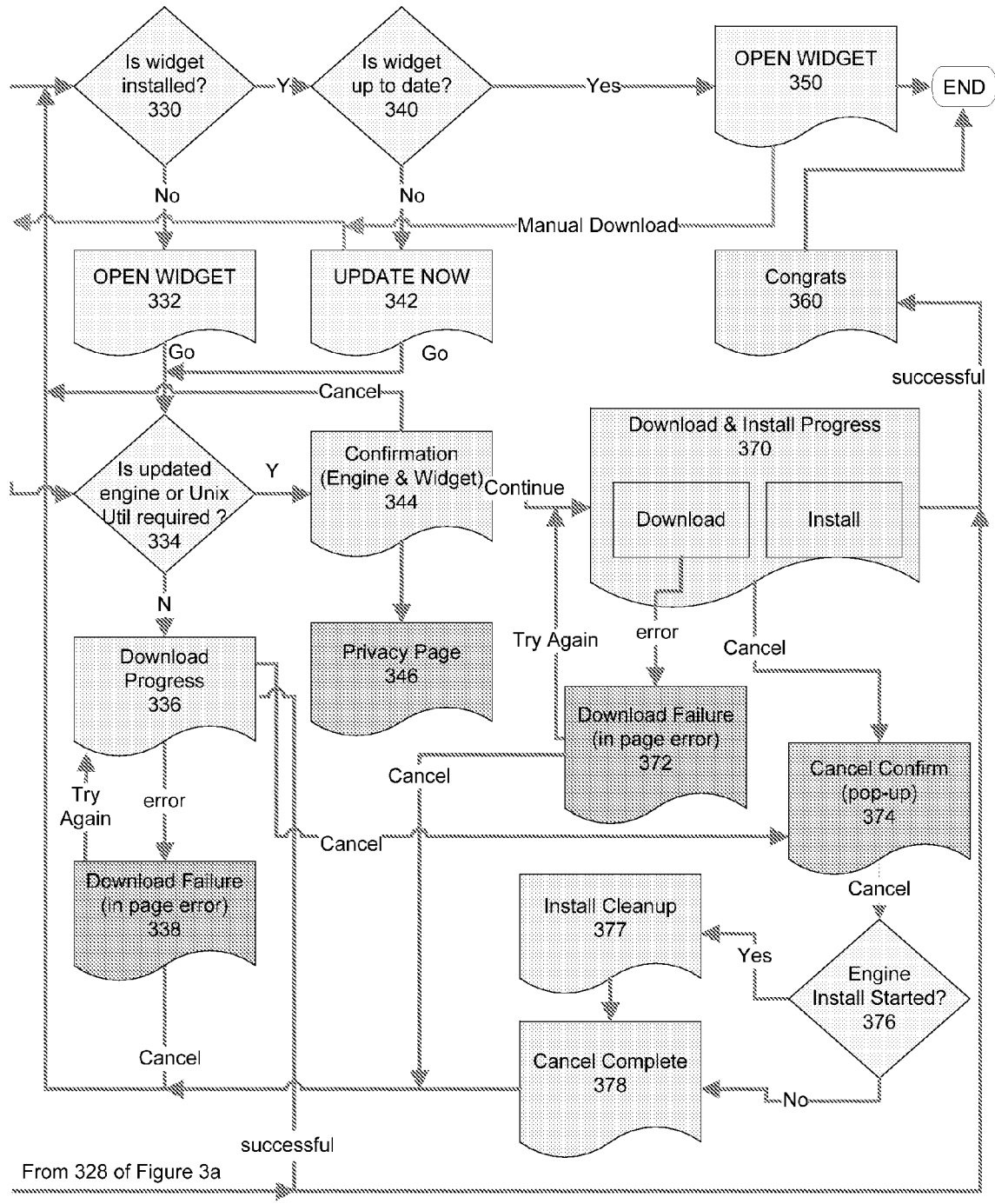
Figure 5:
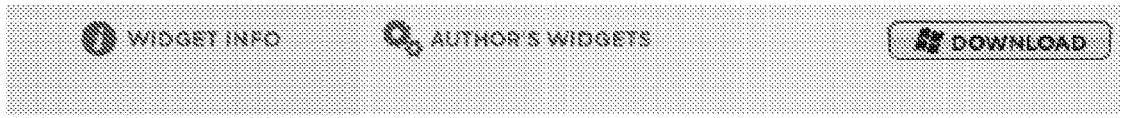
FIG. 5 is a screen capture of an exemplary user interface through which the user can initiate the download and installation of software using an in-page installer.

FIGS. 3a and 3b are block diagrams illustrating an exemplary method through which software can be installed on a user's computing device using an in-page software installer. The method begins at Block 300 of FIG. 3a. In this embodiment, the browser determines whether the operating system running on the user's computing device is one for which the in-page installation of computer software is supported, whether an appropriate scripting engine exists on the computing device, and whether an in-page installable version of the software is available for the computing device (Block 301). In some embodiments, the instant method can leverage JAVA scripts to effect the in-page installation, although alternative scripting languages may be substituted therefor without departing from the spirit or the scope of the invention. If the operating system is one for which the in-page installation of computer software is not available, if an appropriate scripting engine does not exist on the computing device, or if an in-page installable version of the software is not available, then the instant method obtains a link through which the software can be downloaded (Block 302). The instant method subsequently displays a dialog box, web page, or other user interface, such as, without limitation, the web page illustrated in FIG. 5, through which the user can initiate the download of a standard installer for the software (Block 303). The user can then choose to run and/or save the installer (Block 304), or to cancel.

If the instant system and methods support the in-page installation of software in the operating system running on the user's computing device, if an appropriate scripting engine exists on the computing device, but if an in-page installable version of the software is not available (Block 305), the user is given the opportunity to download and install the software using a traditional installation program (Block 302). If an in-page installable version of the software is available, the instant method determines whether the code necessary to facilitate in-page installation of the software has been associated with the operating system currently in use on the user computing device (Block 310).

Some embodiments of the in-page software installer utilize two code libraries that are installed on or accessible to the user's computing device. These two code libraries, referred to herein as YInst and YVerInfo, allow additional computer software code in a Web page, such as, without limitation, computer software code written in JAVA, JAVA Script, VBScript, or the like, to communicate with the computing device's operating system in a way that most Web pages cannot. The Web page can utilize YVerInfo to interrogate the computing device to obtain system configuration information, version information, an other, related information for the operating system itself, as well as any installed software applications. Such data can then serve as an input for business logic dictated by the Web page and an application dependency database, thereby determining which software, if any, needs to be installed to allow the user to experience content they have requested.

The YInst code library manages the installation process based on the output of the business logic by obtaining required components from one or more repositories and installing the obtained components in the appropriate order and locations. In some embodiments, all of this can happen without the user ever seeing a browser security dialog or a client installer interface. All required user inputs and displays of information can happen entirely within the context of the original call to action embedded in a Web page. In some embodiments, the functionality provided by the YInst and YVerInfo code libraries may be combined into a single code library. An exemplary object model definition for such a combined code library is attached hereto as Appendix A, and is incorporated herein by reference in its entirety.

Figure 4:
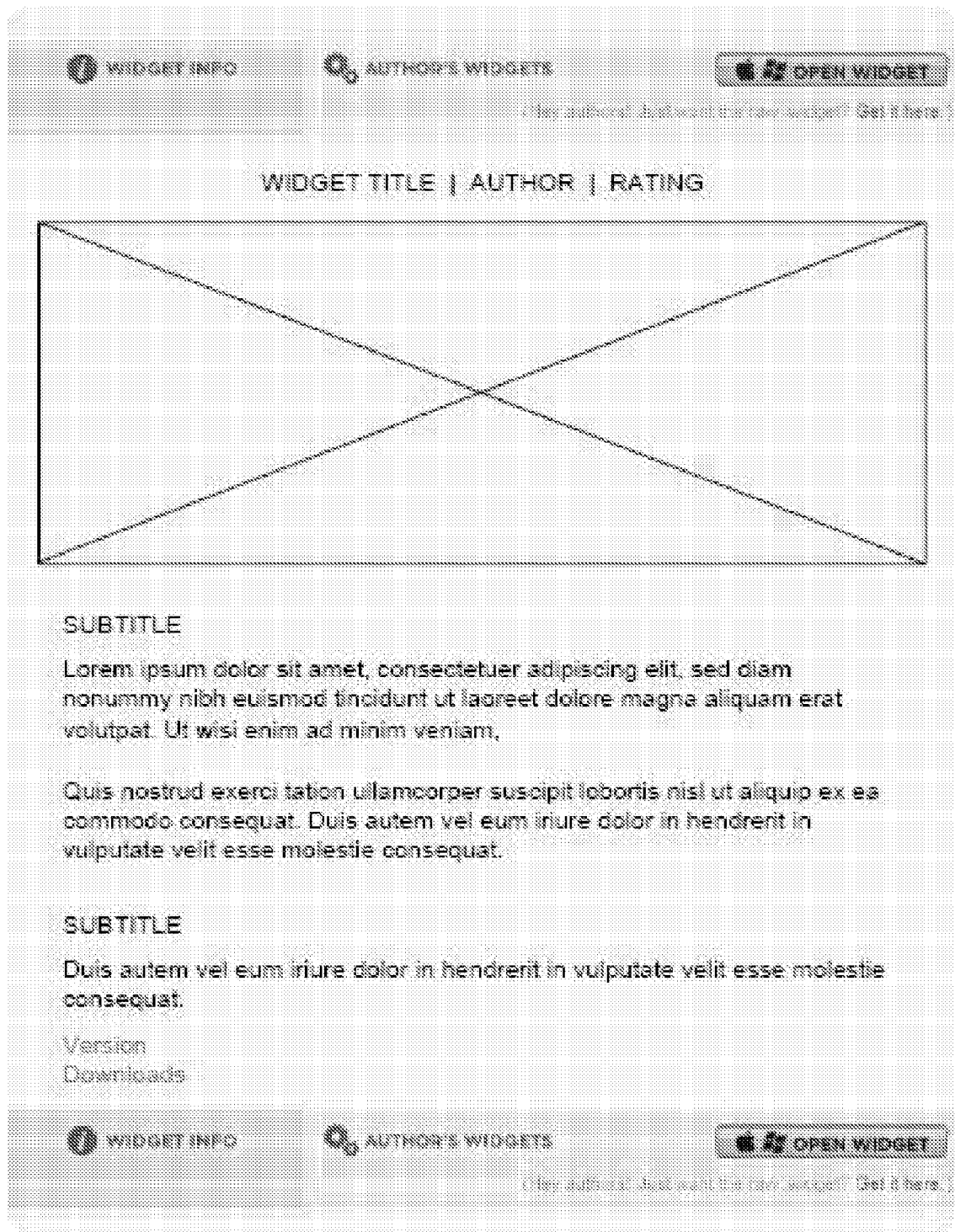
FIG. 4 is a screen capture of an exemplary user interface through which a user can be advised of additional details about software of interest.
Figure 6:
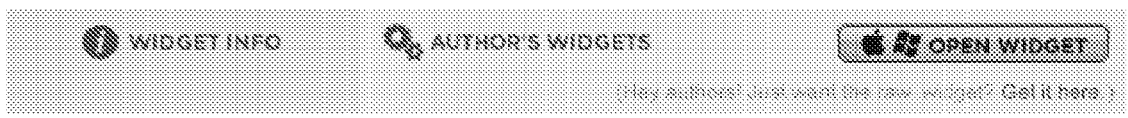
FIG. 6 is a screen capture of an exemplary in-page installer user interface through which the user can cause the software to be opened.
Figure 7:
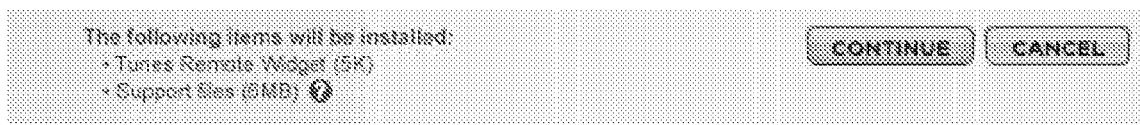
FIG. 7 is a screen capture of an exemplary in-page installer user interface through which the user can acknowledge the installation of the software and related support components.
Figure 8:
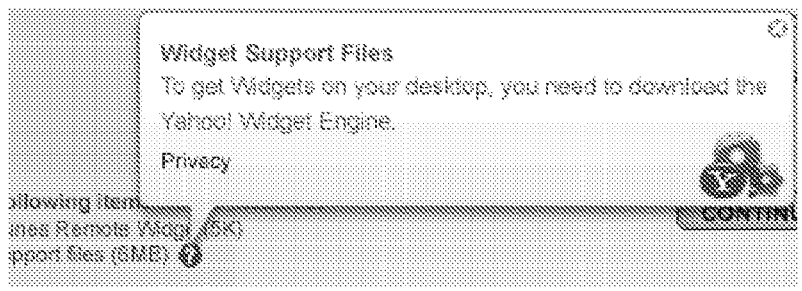
FIG. 8 is a screen capture of an exemplary user interface through which the user can obtain additional information about the related support components.

If the in-page installation code is not available or not associated with the browser in use on the computing device, the user is presented with a dialog box or other user interface (blocks 312 and 314), such as the user interface illustrated in FIG. 6. When the user indicates that the software should be installed, the user may be presented with a subsequent user interface such as that of FIG. 7. A user interface such as the exemplary user interface illustrated in FIG. 7 allows the user to acknowledge that both the in-page installer code and the software will be installed on the user computing device, and that the in-page installer code will be associated with at least the browser currently running on the user computing device. FIG. 8 is an exemplary user interface through which the user can obtain additional information about the in-page installer code or other files that will be installed on the user computer. FIG. 4 is an alternative exemplary interface through which the user can obtain additional information about software. If the user chooses not to have the in-page installer code associated with the browser, the user can be given the opportunity to install the software using a traditional software installer. Once the in-page installer code is installed (Blocks 316 and 318), the method proceeds to Block 320.

Figure 9:
FIG. 9 is a screen capture of an exemplary status bar.
Figure 10:
FIG. 10 is a screen capture of an exemplary status bar.
Figure 11:
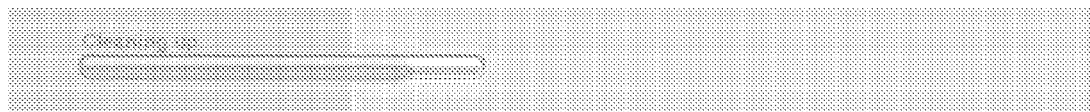
FIG. 11 is a screen capture of an exemplary status bar.
Figure 12:
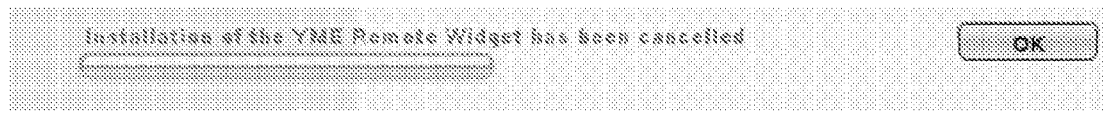
FIG. 12 is a screen capture of an exemplary status bar, indicating that the installation has been canceled.
Figure 13:
FIG. 13 is a screen capture of an exemplary user interface through which the user is advised that the installation is complete.

If the in-page installer code is associated with the browser currently running on the user computing device, the instant method determines whether the latest version of the in-page installer code is currently resident on the user computing device (Block 320). If the latest version of the in-page installer code is not resident on the user computing device, the instant method utilizes the currently-installed version of the in-page installer code to initiate the download and installation of the latest version (Blocks 322, 324, and 326). In some embodiments, the user may be presented with an opportunity to confirm that the latest version of the in-page installer code should be installed. During the download of any large files or groups of files, the instant method may cause the computing device and/or browser to display a status bar or other indication of the download progress, such as the exemplary status bar illustrated in FIG. 9. Similarly, the instant method may cause a status bar to be displayed to convey the installation progress, such as the status bars illustrated in FIGS. 10, 11, and 12. Upon successful updating of the in-page installer code, the instant method can determine whether a version of the software is already installed on the user computing device (Block 328). If the software is already installed, then the instant method optionally causes a congratulatory user interface, such as, without limitation, the user interface illustrated in FIG. 13, to be displayed and launches the software (Block 360). If the software is not installed, the instant method initiates a software installation procedure (Block 334).

Figure 15:
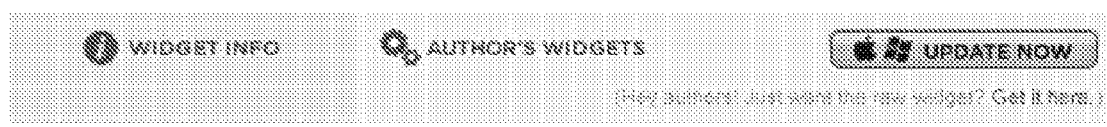
FIG. 15 is a screen capture of an exemplary user interface through which the user can initiate the updating of previously installed software.

If the latest version of the in-page installer code is resident on the user computing device, the instant method proceeds to Block 330. In Block 330, the user computing device is polled to determine whether a version of the software is already resident on the user computing device. By way of example, without limitation, on public or shared computing devices, the user may not be aware that the software had previously been downloaded and installed, thereby potentially obviating the need to reinstall the software. If the software is installed, the instant method can determine whether the latest version is resident on the computing device (Block 340). If the software is installed and the latest version is resident on the computing device, the software is launched (Block 350). If the software is not resident on the computing device, or if a newer version of the software is available, the instant method can initiate the downloading and installation of the software (Blocks 332 and 342). In the event the installation is an update, the instant method can download only those files, or portions of files, that have changed, thereby reducing bandwidth requirements and speeding installation. Further, the user may be presented with a user interface similar to that of FIG. 15, through which the user can confirm that the software should be updated.

Figure 14:
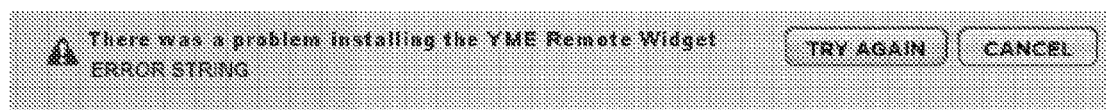
FIG. 14 is a screen capture of an exemplary user interface through which the user is advised of installation and/or download errors.

In some embodiments, the instant method can further determine whether the support components necessary and/or advantageous for the implementation of the software are resident on the computing device (Block 334), and whether any support components that are resident on the computing device need to be updated (Block 344). If the latest version of the support components are already resident on the user computing device, the instant method can initiate the download and installation of the files necessary to facilitate the installation or upgrading of the software (Block 336). If the support components need to be installed and/or updated, the instant method downloads and installs the necessary files (Block 370), including those for the software. Upon completion of the installation, the user may be presented with a user interface, such as that illustrated in FIG. 13, by which the user is informed that the installation is successful and complete. If an error occurs during download or installation of the software or the support components (Blocks 338 and 372), the user may be presented with a user interface similar to that of FIG. 14, through which the user can be informed of the error.

The user may also cancel the download and/or installation of the software or support components at any time (Block 374). If the support component installation was initiated (Block 376), a clean-up process may be initiated to remove those support components (Block 377), after which the cancellation is complete (Block 378).

As described above, the in-page installer uses a browser and an associated scripting engine to facilitate the installation of software on a user computing device. There are several in-page installer distribution embodiments, all of which can take advantage of the exemplary method set forth above, or similar methods. These distribution embodiments include, but are not limited to:

1) hard-coding this functionality manually into an individual Web page
2) creating a module that can be dynamically embedded in any Web page
3) creating a "badge" (using IFRAMEs) that can be dynamically embedded in any Web page
4) embedding this functionality into ad-served media.

Figure 16:
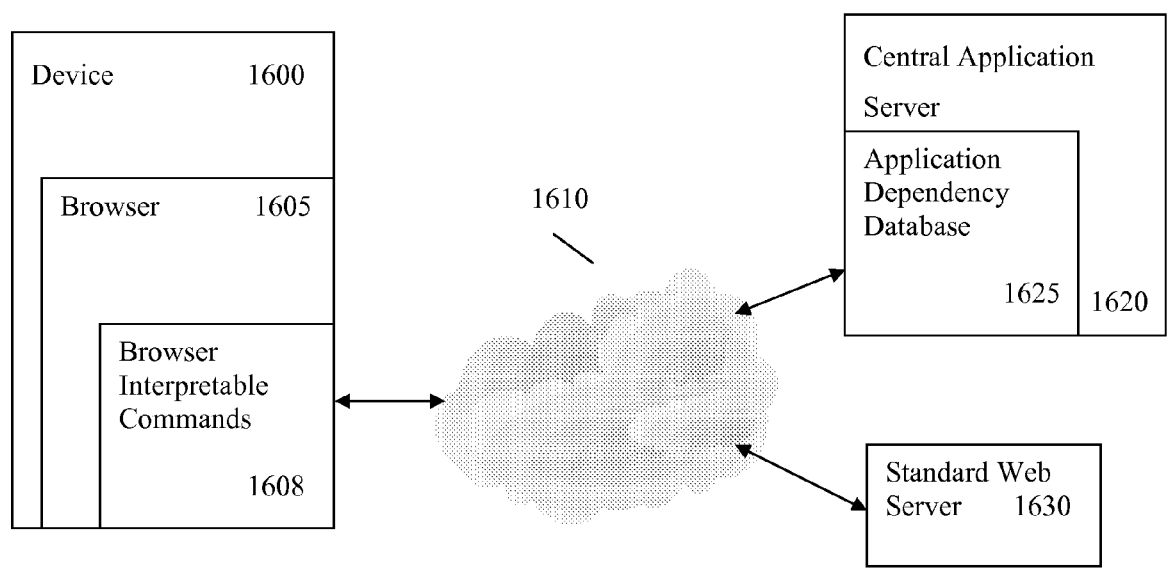
FIG. 16 is a functional block diagram illustrating an exemplary network architecture supporting the implementation of an in-page installer.

FIG. 16 illustrates an exemplary architecture through which the in-page installer can operate. In the illustrated embodiment, the in-page installer is distributed as browser-interpretable commands 1608, which run in browser 1605 on user computing device 1600. When a user uses browser 1605 to visit a Web page served by standard web server 1630, the user may be presented with the opportunity to install software of interest to the user, as determined by comparing the user's interests and/or preferences with software available from central application server 1620. When the user indicates a desire to install the software, browser interpretable commands 1608 can obtain the necessary files and installation scripts from application dependency database 1625. Application dependency database 1625 may provide standard installation scripts, or may create customized installation scripts based on user preferences, the configuration of browser 1605, and/or the configuration of user computing device 1600. In some embodiments, at least portions of any installation script obtained from application dependency database 1625 may be digitally signed, there by permitting browser interpretable commands 1608 to verify that the installation script is from a trusted source. Such digital signatures may be accomplished through a variety of means, including, without limitation, using the RSA, SHA, and GMR signature schemes. In some embodiments, the digital signature information can be embedded in a larger set of scripts, thereby permitting the scripts to be self-authenticating. In some embodiments, the portions of the scripts that are digitally signed may be limited to only those instructions that require elevated privileges to properly interact with the operating system, the browser, the device, or the like.

While detailed and specific embodiments of the in-page computer software installer have been described herein, it will be apparent to those skilled in the art that various changes and modifications can be made therein without departing from the spirit and scope of the in-page computer software installer. Thus, it is intended that the present disclosure cover these modifications and variations provided they come within the scope of any appended claims and/or their equivalents.

What is claimed is:

1. A method comprising:
   monitoring, over a network, user interactions of a user with a browser running on a computing device during a browsing session;
   determining, via a server, a context for the browsing session based on the monitored user interactions;
   determining, via the server, whether software relevant to the context is available;
   recommending, via the server, the determined software to the user, wherein the determined software is recommended to the user through content dynamically incorporated into a web page appearing in the browser; and
   facilitating installation of the determined software on the computing device through an in-page installer over the network, wherein said installation dynamically tailors the determined software based on the context and configuration of the user's computing device.

2. The method of claim 1, wherein the facilitating step further comprises:
   determining whether the browser is a supported browser and facilitating the installation of the determined software through a standard installer if the browser is not a supported browser;
   determining whether necessary code libraries are installed on the computing device and installing any needed code libraries on the computing device;
   obtaining from a central application server an installation script; and
   causing the browser to initiate the installation script.

3. The method of claim 2, wherein at least a portion of the installation script is digitally signed.

4. The method of claim 3, wherein the portion of the installation script that is digitally signed comprises instructions that need elevated privileges to run.

5. The method of claim 3, further comprising:
   verifying that the installation script is from a trusted source based on the digital signature.

6. The method of claim 5, further comprising:
   refusing to perform the installation if the installation script is not verified.

7. The method of claim 5, further comprising:
   informing the user that the installation script cannot be verified;
   requesting from the user authorization to proceed with the installation; and
   exiting the method if the user does not authorize the installation.

8. The method of claim 1, further comprising building a profile for the user based on the monitored user interactions.

9. The method of claim 1, wherein the determined software is recommended to the user through an advertisement.

10. The method of claim 1, wherein the context is determined in part based on results from a search performed by the user via the browser.

11. The method of claim 10, wherein the search comprises a search of a computer software application repository.

12. The method of claim 1, wherein the context is determined in part based on keywords in a web page currently displayed by the browser.

13. The method of claim 1, wherein the context is determined in part based on metadata associated with a web page currently displayed by the browser.

14. A system comprising:
    an application server;
    an application dependency database; and
    a set of commands, interpretable by a browser operating on a computing device, wherein the set of commands, when interpreted by the browser, facilitate:
       determining a context for a browser session;
       obtaining an installation script from the application dependency database;
       obtaining files referenced in the installation script from the application server;
       verifying that at least the portions of the installation script that require elevated privileges to operate are digitally signed by a trusted source; and
       executing the installation script to install the software, wherein the software installation comprises dynamically tailoring the software based on the context and configuration of the computing device.

15. The system of claim 14, wherein the application server comprises the application dependency database.

16. The system of claim 14, further comprising a first code library, installed on the computing device, wherein the first code library facilitates interaction between an operating system running on the computing device and the browser.

17. The system of claim 16, further comprising a second code library, installed on the computing device, wherein the second code library facilitates obtaining information about the operating system and other software applications installed on the computing device.

18. The system of claim 17, wherein the first code library and the second code library are incorporated into a single code library.

19. The system of claim 14, wherein the set of commands further comprises instructions for informing a user if at least a portion of the trusted script is not digitally signed by a trusted source and requesting from the user authorization to proceed with the installation.

20. The system of claim 14, wherein the context is determined in part based on results from a search performed by a user via the browser.

21. The system of claim 14, wherein the search comprises a search of a computer software application repository.

22. The system of claim 14, wherein the context is determined in part based on keywords in the page currently displayed by the browser.

23. The system of claim 14, wherein the context is determined in part based on metadata associated with the page currently displayed by the browser.

24. A computer-readable storage medium tangibly encoded with a computer program product comprising computer program logic executable by a processor comprising:
  instructions, executed by the processor, for monitoring user interactions with a browser running on a computing device during a browsing session;
  instructions, executed by the processor, for determining a context for the browsing session based on the monitored user interactions;
  instructions, executed by the processor, for determining whether software relevant to the context is available;
  instructions, executed by the processor, for recommending the determined software to the user, wherein the determined software is recommended to the user through content dynamically incorporated into a web page appearing in the browser; and
  instructions, executed by the processor, for facilitating the installation of the determined software through an in-page installer, wherein said installation dynamically tailors the determined software based on the context and configuration of the user's computing device.

25. The computer-readable storage medium of claim 24, further comprising:
  instructions for determining whether the browser is a supported browser and facilitating the installation of the determined software through a standard installer if the browser is not a supported browser;
  instructions for determining whether the necessary code libraries are installed on the computing device and installing any needed code libraries on the computing device;
  instructions for obtaining from a central application server an installation script; and
  instructions for causing the browser to initiate the installation script.

26. The computer-readable storage medium of claim 25, further comprising instructions for verifying that the installation script is from a trusted source based on a digital signature.

27. The computer-readable storage medium of claim 26, further comprising instructions for refusing to perform the installation if the installation script is not verified.

28. The computer-readable storage medium of claim 26, further comprising:
  instructions for informing the user that the installation script cannot be verified;
  instructions for requesting from the user authorization to proceed with the installation; and
  instructions for aborting the installation if the user does not authorize the installation.

29. The computer-readable storage medium of claim 25, further comprising instructions for building a profile for the user based on the monitored user interactions.

30. The computer-readable storage medium of claim 25, further comprising instructions for recommending the determined software to the user through an advertisement.

31. The computer-readable storage medium of claim 24, wherein the context is determined in part based on results from a search performed by the user via the browser.

32. The computer-readable storage medium of claim 31, wherein the search comprises a search of a computer software application repository.

33. The computer-readable storage medium of claim 24, wherein the context is determined in part based on keywords in a web page currently displayed by the browser.

34. The computer-readable storage medium of claim 24, wherein the context is determined in part based on metadata associated with a web page currently displayed by the browser.

35. A system comprising:
  a web server;
  an application server;
  an application dependency database;
  a communication path via which the web server can communicate with a browser capable of rendering content presented by the web server; and
  a set of commands, interpretable by the browser, wherein the set of commands facilitate:
    determining a context for a browser session;
    obtaining an installation script from the application dependency database;
    obtaining files referenced in the installation script from the application server;
    verifying that at least the portions of the installation script that require elevated privileges to operate are digitally signed by a trusted source; and
    executing the installation script to install software on a computing device,
  wherein the software installation comprises dynamically tailoring the software based on the context and configuration of the computing device.

36. The system of claim 35, wherein the application server comprises the application dependency database.

37. The system of claim 35, further comprising a first code library, installed on the computing device, wherein the first code library facilitates interaction between an operating system running on the computing device and the browser.

38. The system of claim 37, further comprising a second code library, installed on the computing device, wherein the second code library facilitates obtaining information about the operating system and other software applications installed on the computing device.

39. The system of claim 38, wherein the first code library and the second code library are incorporated into a single code library.

40. The system of claim 35, wherein the set of commands further comprises instructions for informing the user if at least a portion of the trusted script is not digitally signed by a trusted source and requesting from the user authorization to proceed with the installation.

41. The system of claim 35, wherein the context is determined in part based on results from a search performed by the user via the browser.

42. The system of claim 35, wherein the search comprises a search of a computer software application repository.

43. The system of claim 35, wherein the context is determined in part based on keywords in the page currently displayed by the browser.

44. The system of claim 35, wherein the context is determined in part based on metadata associated with the page currently displayed by the browser.

* * * * *